(12) United States Patent
Lee et al.

(10) Patent No.: US 12,444,541 B2
(45) Date of Patent: Oct. 14, 2025

(54) MULTILAYER ELECTRONIC COMPONENT

(71) Applicant: SAMSUNG ELECTRO-MECHANICS CO., LTD., Suwon-si (KR)

(72) Inventors: Chung Yeol Lee, Suwon-si (KR); Jun Il Kang, Suwon-si (KR); Hee Jung Jung, Suwon-si (KR); Jong Rock Lee, Suwon-si (KR); Cheong Kim, Suwon-si (KR); Hiroki Okada, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 175 days.

(21) Appl. No.: 18/235,064

(22) Filed: Aug. 17, 2023

(65) Prior Publication Data

US 2024/0331946 A1    Oct. 3, 2024

(30) Foreign Application Priority Data

Mar. 31, 2023    (KR) .................. 10-2023-0042918

(51) Int. Cl.
| | |
|---|---|
| *H01G 4/30* | (2006.01) |
| *H01G 4/008* | (2006.01) |
| *H01G 4/012* | (2006.01) |
| *H01G 4/08* | (2006.01) |
| *H01G 4/12* | (2006.01) |

(52) U.S. Cl.
CPC ............... *H01G 4/30* (2013.01); *H01G 4/008* (2013.01); *H01G 4/012* (2013.01); *H01G 4/12* (2013.01)

(58) Field of Classification Search
CPC .......... H10G 4/30; H01G 4/008; H01G 4/012; H01G 4/12; H01G 4/2325; H01G 4/248; H01G 4/1272
USPC ............ 361/301.1, 311, 301.4, 321.1, 306.3, 361/321.3
See application file for complete search history.

(56) References Cited

U.S. PATENT DOCUMENTS

| | | | |
|---|---|---|---|
| 2009/0290280 A1 | 11/2009 | Takeuchi et al. | |
| 2013/0220696 A1* | 8/2013 | Otani | H01G 4/12 174/534 |
| 2013/0294010 A1* | 11/2013 | Lee | H01G 4/30 29/25.42 |
| 2016/0372255 A1* | 12/2016 | Maki | H01F 41/041 |
| 2017/0040112 A1* | 2/2017 | Tanaka | H01G 4/232 |
| 2020/0066449 A1* | 2/2020 | Tsutsumi | C25D 5/024 |
| 2020/0152390 A1* | 5/2020 | Yeon | H01G 4/012 |
| 2021/0082623 A1 | 3/2021 | Kim et al. | |
| 2021/0327649 A1 | 10/2021 | Muramatsu et al. | |
| 2022/0148813 A1 | 5/2022 | Lee et al. | |

(Continued)

FOREIGN PATENT DOCUMENTS

| | | |
|---|---|---|
| JP | 2009-283597 A | 12/2009 |
| JP | 2021-174793 A | 11/2021 |

(Continued)

*Primary Examiner* — Arun Ramaswamy
(74) *Attorney, Agent, or Firm* — Morgan, Lewis & Bockius LLP

(57) ABSTRACT

A multilayer electronic component, may include: a body including a dielectric layer and internal electrodes; and an external electrode disposed on the body, in which a lattice-type groove shape having a plurality of grooves arranged in a lattice form may be formed in at least a portion of a surface of the body.

22 Claims, 8 Drawing Sheets

(56) References Cited

U.S. PATENT DOCUMENTS

2023/0095128 A1* 3/2023 Muramatsu .......... H01G 4/0085
361/301.4

FOREIGN PATENT DOCUMENTS

| KR | 10-2021-0033132 A | 3/2021 |
| KR | 10-2022-0063556 A | 5/2022 |

* cited by examiner

MULTILAYER ELECTRONIC COMPONENT

CROSS-REFERENCE TO RELATED APPLICATION(S)

This application claims benefit of priority to Korean Patent Application No. 10-2023-0042918 filed on Mar. 31, 2023 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), one of multilayer electronic components, is a chip-type condenser mounted on printed circuit boards of several electronic products such as an image display device, for example, a liquid crystal display (LCD), a plasma display panel (PDP) or the like, a computer, a smartphone, a mobile phone, and the like, serving to charge or discharge electricity therein or therefrom.

The multilayer ceramic capacitor may be used as a component of various electronic apparatuses since it has a small size, implements high capacitance, and may be easily mounted. In accordance with miniaturization and an increase in output of various electronic apparatuses such as computers and mobile devices, demand for miniaturization and high capacitance increase of the multilayer ceramic capacitors has increased.

Meanwhile, as a method for simultaneously implementing miniaturization and high capacitance, a method of using a material having a high dielectric constant or reducing a thickness of a dielectric layer or an internal electrode layer, may be used. However, when the thickness of the dielectric layer is excessively reduced, problems such as a decrease in a dielectric breakdown voltage (BDV) or a decrease in reliability may occur.

Therefore, by applying a method of thinning an external electrode, it is possible to minimize a volume of a portion, not directly related to the capacitance of the multilayer electronic component and maximize an effective volume. As a method of thinning the external electrode, there are methods of forming the external electrode with a plating film or applying a thin film deposition method such as sputtering, or the like, thereon, but when the external electrode is formed by these methods, there is a concern that delamination between the body and the external electrode may occur due to lack of bonding strength with a ceramic body.

In order to solve this problem, research is being conducted to perform various pretreatments such as forming surface roughness on a body, forming other materials, or the like, so that bonding between the ceramic body and external electrodes can be facilitated.

SUMMARY

An aspect of the present disclosure is to achieve miniaturization and high capacitance of a multilayer electronic component.

Another aspect of the present disclosure is to improve reliability of a multilayer electronic component.

Another aspect of the present disclosure is to suppress a phenomenon of delamination or lifting between a body and an external electrode.

However, the object of the present disclosure is not limited to the above, and will be more easily understood in the process of describing specific embodiments of the present disclosure.

According to an aspect of the present disclosure, a multilayer electronic component, may include: a body including a dielectric layer and internal electrodes; and an external electrode disposed on the body. A lattice-type groove shape having a plurality of grooves arranged in a lattice form may be formed in at least a portion of a surface of the body.

According to another aspect of the present disclosure, a multilayer electronic component, may include: a body including a dielectric layer and internal electrodes; and an external electrode disposed on the body. At least a portion of a surface of the body that is covered by the external electrode has a repetitive pattern shaped by a plurality of grooves forming a plurality of areas, each area being surrounded by the grooves.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
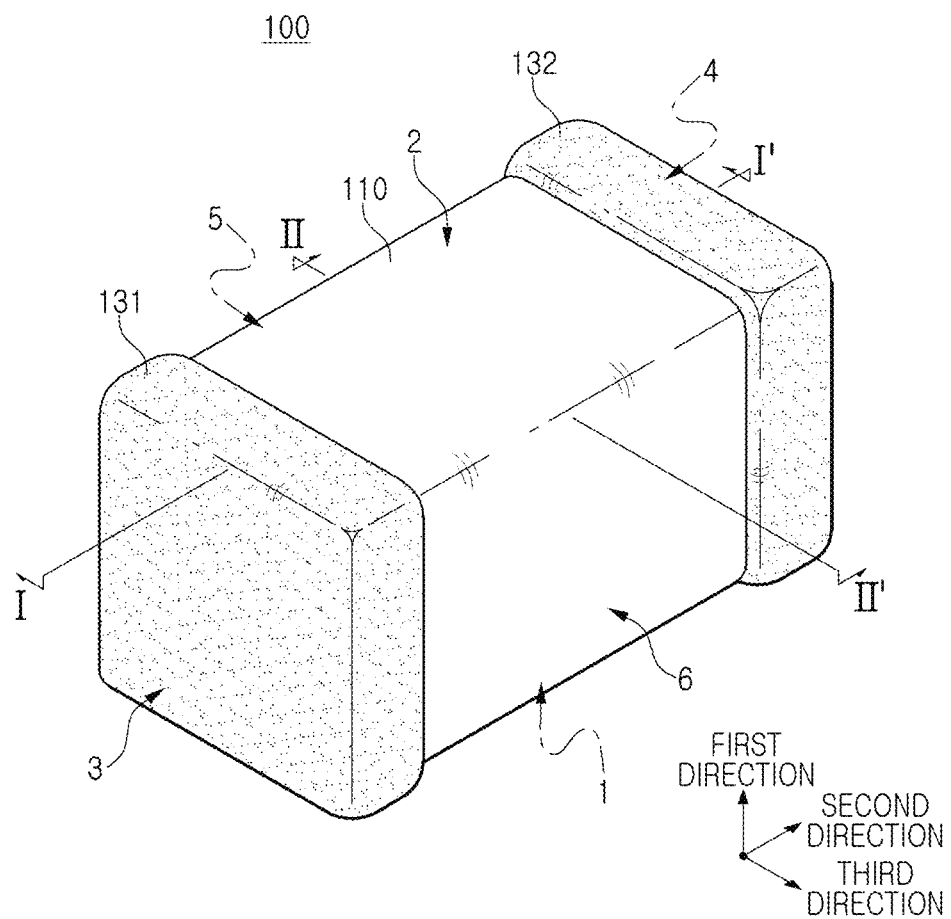
FIG. 1 a schematic perspective view of a multilayer electronic component according to an embodiment of the present disclosure.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are the same elements in the drawings.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may further include other components as well, rather than excluding other components, unless specifically stated otherwise.

In the drawings, a first direction may refer to a stacking direction or a thickness (T) direction, a second direction may refer to a length (L) direction, and a third direction may refer to a width (W) direction.

MULTILAYER ELECTRONIC COMPONENT

FIG. 1 schematically illustrates a perspective view of a multilayer electronic component according to an embodiment of the present disclosure.

Figure 2:
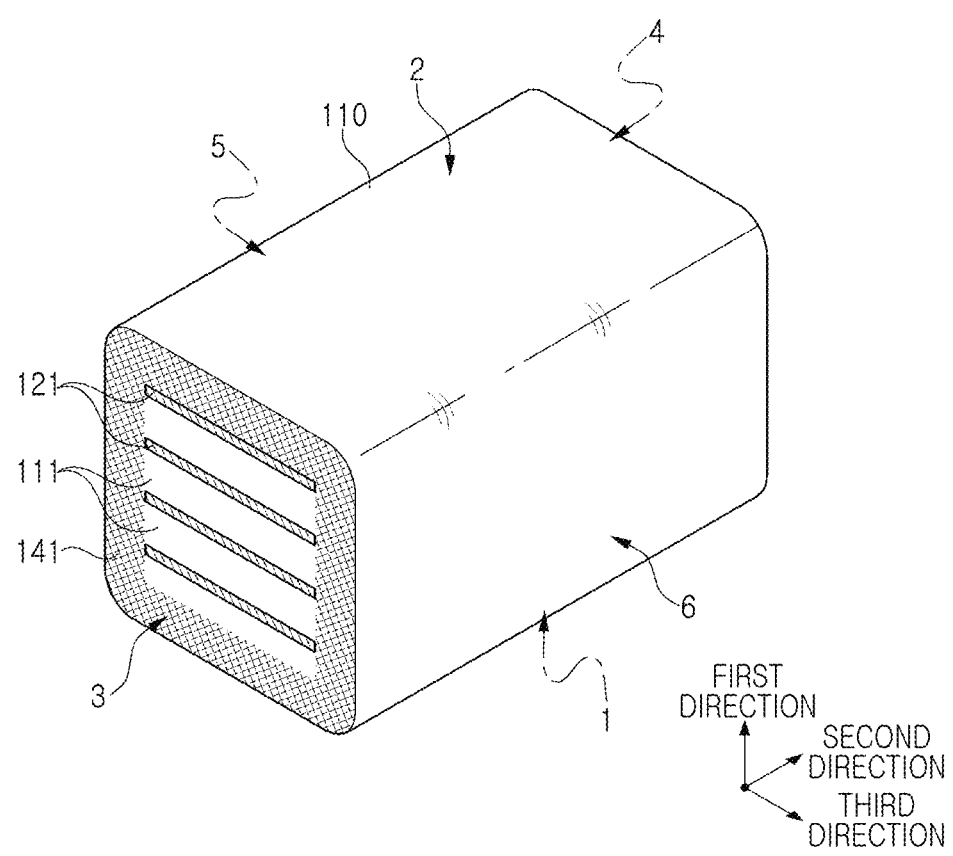
FIG. 2 is a schematic perspective view of the multilayer electronic component of FIG. 1 excluding external electrodes.

FIG. 2 is a schematic perspective view of the multilayer electronic component of FIG. 1 excluding external electrodes.

Figure 3:
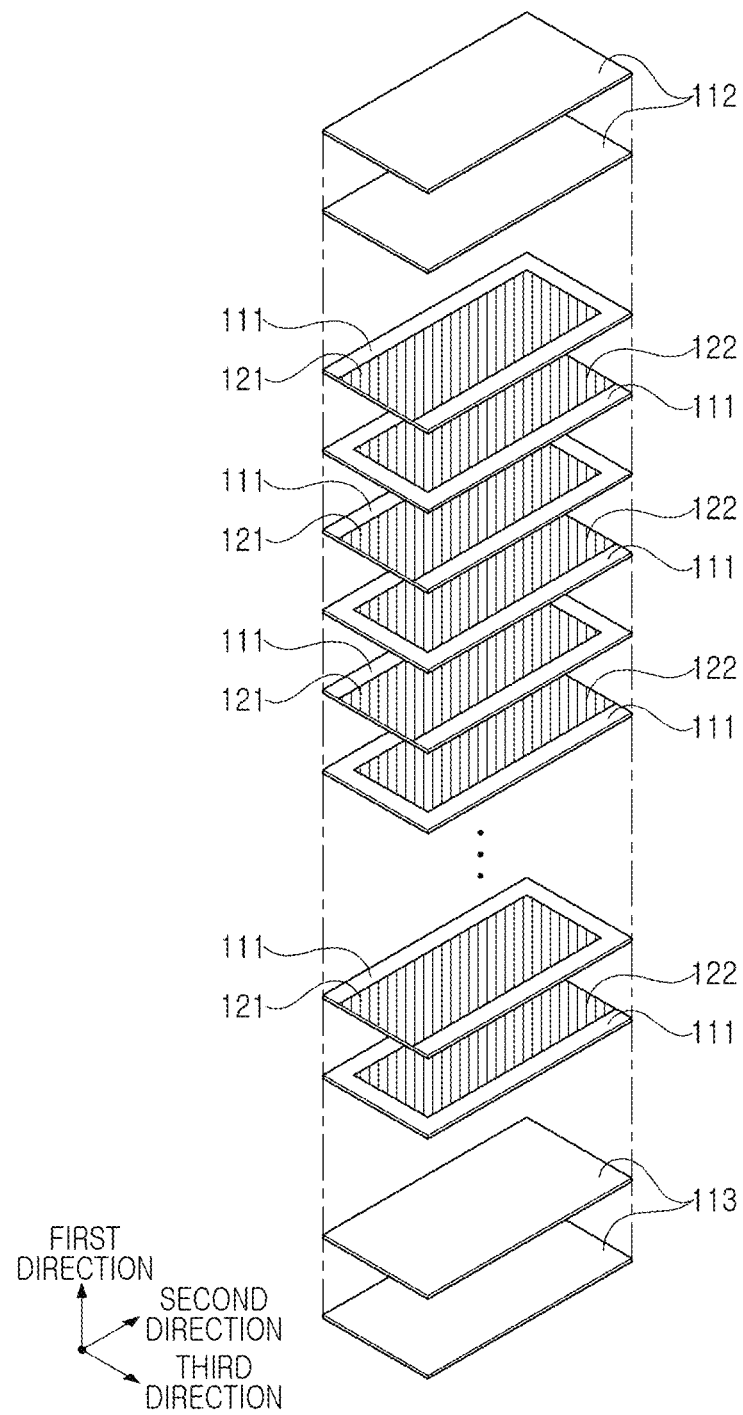
FIG. 3 is a schematic exploded perspective view illustrating a stacked structure of internal electrodes.

FIG. 3 is a schematic exploded perspective view illustrating a stacked structure of internal electrodes.

Figure 4:
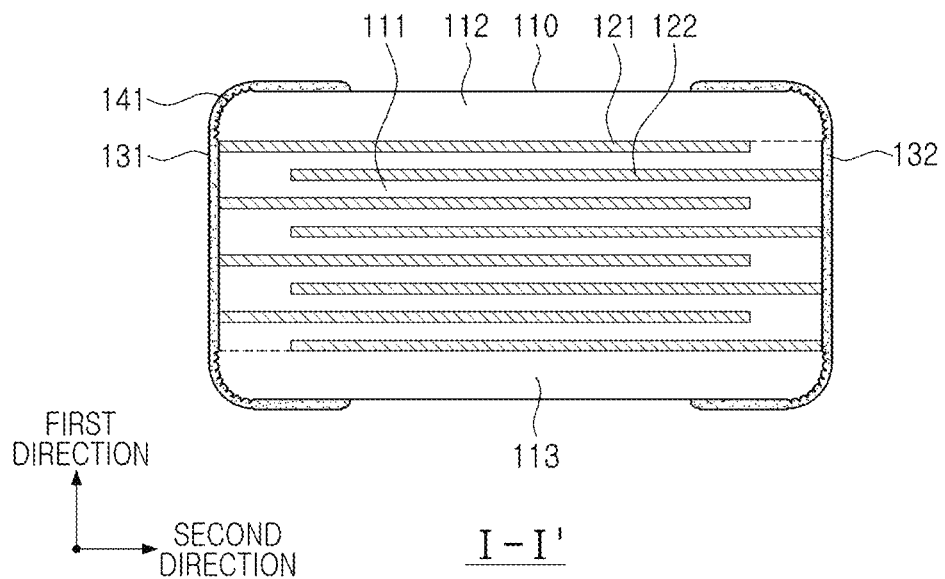
FIG. 4 is a schematic cross-sectional view taken along line I-I' of FIG. 1.

FIG. 4 is a schematic cross-sectional view taken along line I-I' of FIG. 1.

Figure 5:
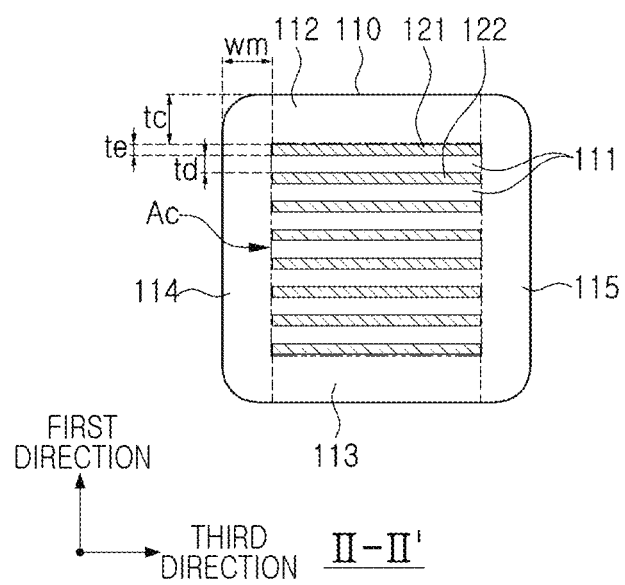
FIG. 5 is a schematic cross-sectional view taken along line II-II' of FIG. 1.
Figure 6:
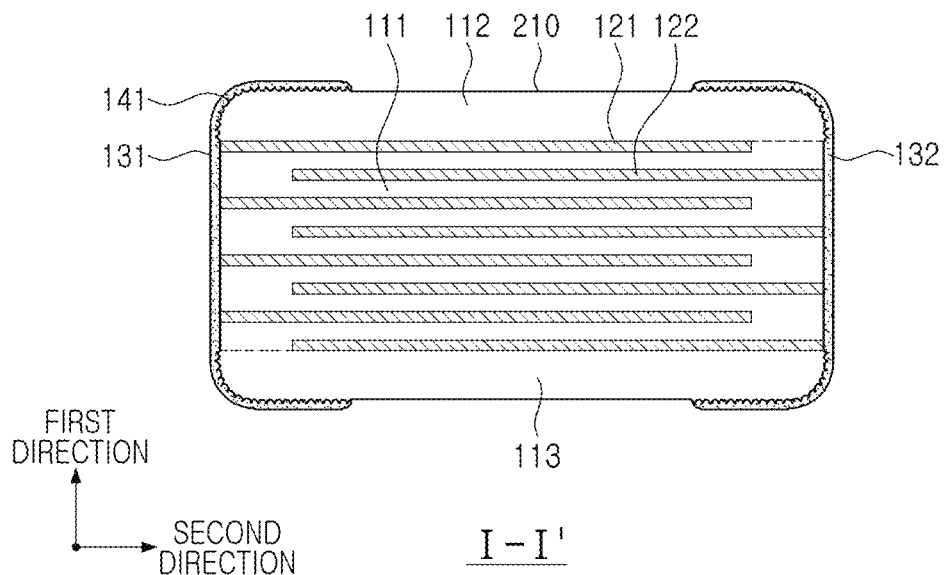
FIG. 6 is a schematic cross-sectional view taken along line I-I' of another embodiment of the present disclosure.

FIG. 5 is a schematic cross-sectional view taken along line II-II' of FIG. 1.

Figure 7:
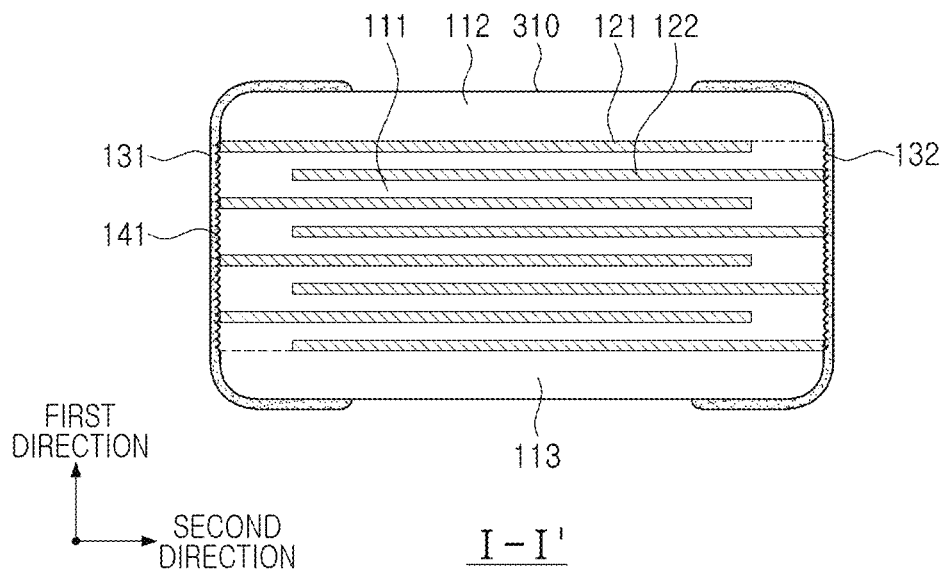
FIG. 7 is a schematic cross-sectional view taken along line I-I' of another embodiment of the present disclosure.

FIG. 7 is a schematic cross-sectional view taken along line I-I' of another embodiment of the present disclosure.

Figure 8:
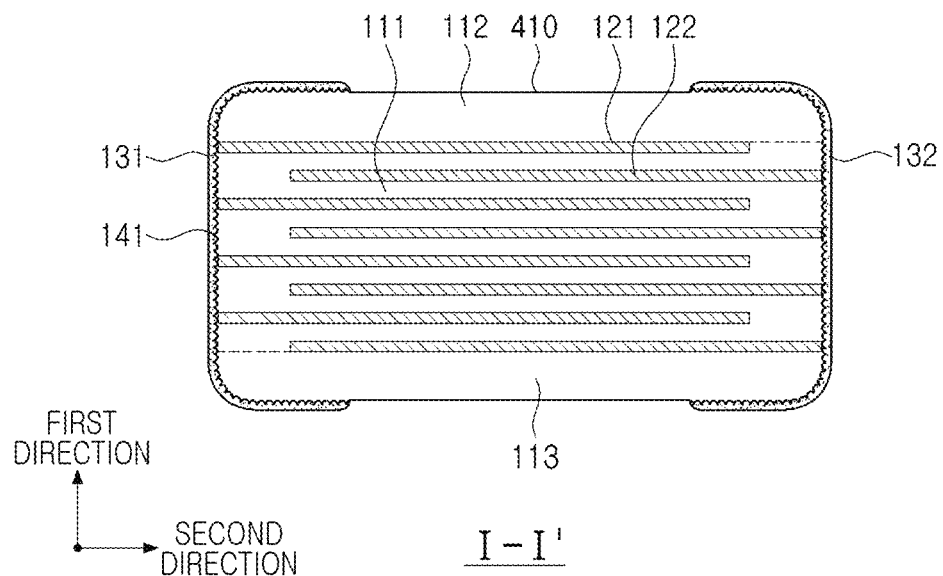
FIG. 8 is a schematic cross-sectional view taken along line I-I' of another embodiment of the present disclosure.

FIG. 8 is a schematic cross-sectional view taken along line I-I' of another embodiment of the present disclosure.

Figure 9:
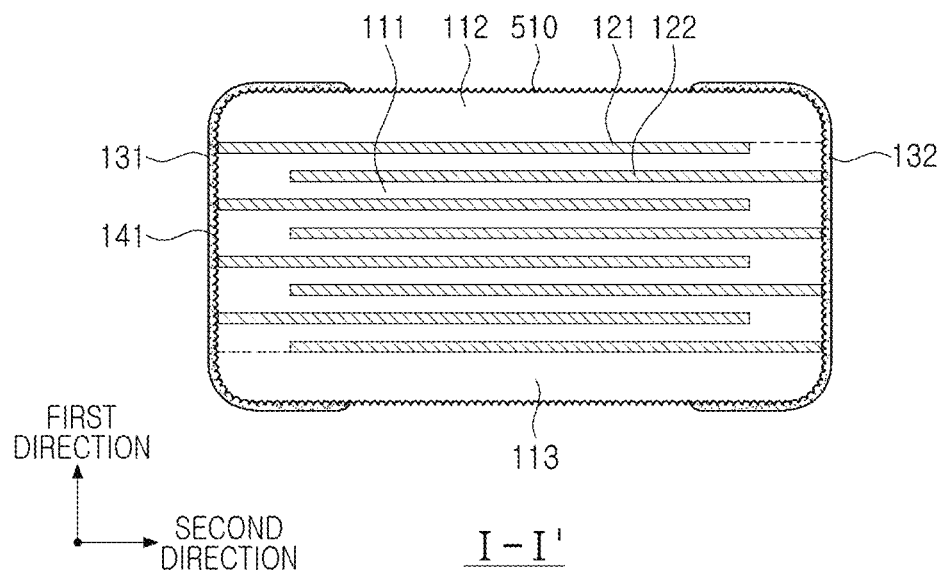
FIG. 9 is a schematic cross-sectional view taken along line I-I' of another embodiment of the present disclosure.

FIG. 9 is a schematic cross-sectional view taken along line I-I' of another embodiment of the present disclosure.

Figure 10:
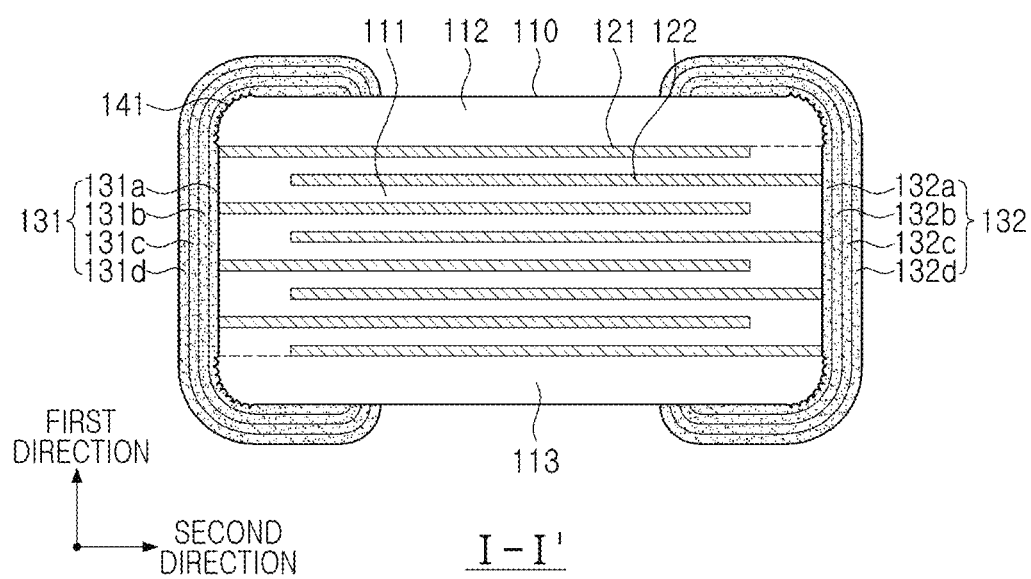
FIG. 10 is a schematic cross-sectional view of the external electrode structure of FIG. 4.

FIG. 10 is a schematic cross-sectional view of the external electrode structure of FIG. 4.

Hereinafter, a multilayer electronic component according to an embodiment in the present disclosure will be described with reference to FIGS. 1 to 10. However, a multilayer ceramic capacitor will be described as an example of a multilayer electronic component, but the present disclosure may also be applied to various electronic components such as inductors, piezoelectric elements, varistors, thermistors, or the like.

According to an aspect of the present disclosure, a multilayer electronic component 100, may include: a body 110 including a dielectric layer 111 and internal electrodes 121 and 122; and external electrodes 131 and 132 disposed on the body 110. A lattice-type groove shape 141 having a plurality of grooves arranged in a lattice form may be formed in at least a portion of a surface of the body 110.

The body 110 has a dielectric layer 111 and internal electrodes 121 and 122, alternately stacked therein.

More specifically, the body 110 may include a capacitance formation portion Ac including a first internal electrode 121 and a second internal electrode 122 disposed inside the body 110 and alternately disposed to face each other with the dielectric layer 111 interposed therebetween to form capacitance.

The body 110 is not limited to a particular shape, and may have a hexahedral shape or a shape similar to the hexahedral shape, as illustrated in the drawings. The body 110 may not have a hexahedral shape having perfectly straight lines because ceramic powder particles included in the body 110 are contracted in a process in which the body is sintered. However, the body 110 may have a substantially hexahedral shape.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3, and 4 and opposing each other in a third direction.

A plurality of dielectric layers 111 forming the body 110 may be in a sintered state, and adjacent dielectric layers 111 may be integrated with each other, such that boundaries therebetween may not be readily apparent without using a scanning electron microscope (SEM).

A raw material for forming the dielectric layer 111 is not particularly limited, as long as sufficient electrostatic capacitance may be obtained therewith. In general, a perovskite ($ABO_3$)-based material may be used, and for example, a barium titanate ($BaTiO_3$)-based material, a lead composite perovskite-based material, a strontium titanate ($SrTiO_3$)-based material, or the like, may be used. The barium titanate-based material may include $BaTiO_3$-based ceramic powder, and the ceramic powder may be, for example, $BaTiO_3$, $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$), $Ba(Ti_{1-y}Zr_y)O_3$ ($0<y<1$), or the like, in which calcium (Ca), zirconium (Zr), or the like, are partially dissolved in $BaTiO_3$.

In addition, a raw material of the dielectric layer 111 may include various ceramic additives, organic solvents, binders, dispersants, and the like, added to powder particles such as barium titanate ($BaTiO_3$) powder particles, or the like, according to an object of the present disclosure.

Meanwhile, a thickness "td" of the dielectric layer 111 is not particularly limited.

However, in order to more easily achieve miniaturization and high capacitance of the multilayer electronic component, the thickness of the dielectric layer 111 may be 0.6 μm or less, more preferably 0.4 μm or less.

Here, the thickness td of the dielectric layer 111 may refer to a thickness "td" of the dielectric layer 111 disposed between the first and second internal electrodes 121 and 122.

Meanwhile, the thickness "td" of the dielectric layer 111 may refer to a size of the dielectric layer 111 in a first direction. In addition, the thickness "td" of the dielectric layer 111 may refer to an average thickness td" of the dielectric layer 111, and may refer to an average size of the dielectric layer 111 in the first direction.

The average size of the dielectric layer 111 in the first direction may be measured from an image obtained by scanning a cross-section of the body 110 in first and second directions with a scanning electron microscope (SEM) with a magnification of 10,000. More specifically, an average size of one dielectric layer 111 in the first direction may refer to an average value calculated by measuring the size of one dielectric layer 111 in a second direction at 30 equally spaced points in the first direction from the scanned image. The 30 equally spaced points may be designated in the capacitance formation portion Ac. In addition, if the average value is measured by extending the average value measurement to 10 dielectric layers, the average size of the dielectric layer 111 in the first direction can be more generalized.

The internal electrodes 121 and 122 may be alternately stacked with the dielectric layer 111.

The internal electrodes 121 and 122 may include a first internal electrode 121 and a second internal electrode 122, and the first and second internal electrodes 121 and 122 may be alternately disposed to oppose each other with the dielectric layer 111 constituting the body 110 therebetween, and may be respectively exposed to the third and fourth surfaces 3 and 4 of the body 110.

More specifically, the first internal electrode 121 may be exposed while being spaced apart from the fourth surface 4, and the second internal electrode 122 may be exposed while being spaced apart from the third surface 3. A first external electrode 131 may be disposed on the third surface 3 of the body 110 and connected to the first internal electrode 121, and a second external electrode 132 may be disposed on the fourth surface 4 of the body 110 and connected to the second internal electrode 122.

That is, the first internal electrode 121 may be connected to the first external electrode 131 without being connected to the second external electrode 132, and the second internal electrode 122 may be connected to the second external electrode 132 without being connected to the first external electrode 131. In this case, the first and second internal electrodes 121 and 122 may be electrically separated from each other by the dielectric layer 111 disposed in the middle.

Meanwhile, the body 110 may be formed by alternately stacking ceramic green sheets on which the first internal electrodes 121 are printed and ceramic green sheets on which the second internal electrodes 122 are printed, and then sintering the same.

A material for forming the internal electrodes 121 and 122 is not particularly limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), or alloys thereof.

In addition, the internal electrodes 121 and 122 may be formed by printing a conductive paste for internal electrodes including at least one of nickel (Ni), copper (Cu), palladium (Pd), silver (Ag), gold (Au), platinum (Pt), tin (Sn), tungsten (W), titanium (Ti), or alloys thereof, on a ceramic green sheet. A screen-printing method, a gravure printing method, or the like may be used as a method of printing the conductive paste for internal electrodes, but the present disclosure is not limited thereto.

Meanwhile, a thickness "te" of the internal electrodes 121 and 122 is not particularly limited.

However, in order to more easily achieve miniaturization and high capacitance of the multilayer electronic component, the thickness of the internal electrodes 121 and 122 may be 0.6 µm or less, more preferably 0.4 µm or less.

Here, a thickness "te" of the internal electrodes 121 and 122 may refer to a size of the internal electrodes 121 and 122 in a first direction. In addition, the thickness "te" of the internal electrodes 121 and 122 may refer to an average thickness "te" of the internal electrodes 121 and 122, and may refer to an average size of the internal electrodes 121 and 122 in the first direction.

The average size of the internal electrodes 121 and 122 in the first direction may be measured from an image obtained by scanning a cross-section of the body 110 in first and second directions with a scanning electron microscope (SEM) with a magnification of 10,000. More specifically, an average size of one internal electrode in the first direction may refer to an average value calculated by measuring the size of one internal electrode in a second direction at 30 equally spaced points in the first direction from the scanned image. The 30 equally spaced points may be designated in the capacitance formation portion Ac. In addition, if the average value is measured by extending the average value measurement to 10 internal electrodes 121 and 122, the average size of the internal electrodes 121 and 122 in the first direction can be more generalized.

Meanwhile, the body 110 may include cover portions 112 and 113 disposed on both end surfaces of the capacitance formation portion Ac in a first direction.

More specifically, it may include an upper cover portion 112 disposed above the capacitance formation portion Ac in the first direction and a lower cover portion 113 disposed below the capacitance formation portion Ac in the first direction.

The upper cover portion 112 and the lower cover portion 113 may be formed by stacking a single dielectric layer 111 or two or more dielectric layers 111 on the upper and lower surfaces of the capacitance formation portion Ac in a first direction, respectively, and may serve to basically prevent damage to the internal electrodes 121 and 122 due to physical or chemical stress.

The upper cover portion 112 and the lower cover portion 113 may not include internal electrodes 121 and 122, and may include the same material as that of the dielectric layer 111. That is, the upper cover portion 112 and the lower cover portion 113 may include a ceramic material, for example, a barium titanate ($BaTiO_3$)-based ceramic material.

Meanwhile, a thickness of the cover portions 112 and 113 is not particularly limited.

However, a thickness "tc" of the cover portions 112 and 113 may be 100 µm or less in order to more easily achieve miniaturization and high capacitance of the multilayer electronic component, and may be preferably 30 µm or less, and more preferably 20 µm or less in the case of an ultra-small product.

Here, the thickness "tc" of the cover portions 112 and 113 may refer to a size of the cover portions 112 and 113 in a first direction. In addition, the thickness "tc" of the cover portions 112 and 113 may refer to an average thickness "tc" of the cover portions 112 and 113, and may refer to an average size of the cover portions 112 and 113 in the first direction.

The average size of the cover portions 112 and 113 in the first direction may be measured from an image obtained by scanning a cross-section of the body 110 in a first direction with a scanning electron microscope (SEM) with a magnification of 10,000. More specifically, it may be an average value calculated by measuring the size thereof in the first direction at 30 equally spaced points in a second direction in the scanned image of one cover portion.

In addition, in a cross-section of the body 110 in first and third directions, the average size of the cover portion in the first direction measured by the above-described method may be substantially the same as the average size of the cover portion in the first direction.

Meanwhile, side margin portions 114 and 115 on both end surfaces of the body 110 in a third direction.

More specifically, the side margin portions 114 and 115 may include a first side margin portion 114 disposed on the fifth surface 5 of the body 110 and a second side margin portion 115 disposed on the sixth surface 6 of the body 110. That is, the side margin portions 114 and 115 may be disposed on both end surfaces of the body 110 in a third direction.

As illustrated, the side margin portions 114 and 115 may refer to a region between both ends of the first and second internal electrodes 121 and 122 in a third direction and a boundary surface of the body 110, based on a cross-section of the body 110 in first and third directions.

The side margin portions 114 and 115 may basically serve to prevent damage to the internal electrodes 121 and 122 due to physical or chemical stress.

The side margin portions 114 and 115 may be formed by applying a conductive paste to ceramic green sheets, except for where the side margin portions 114 and 115 are to be formed to form internal electrodes 121 and 122, and in order to suppress a step formed by the internal electrodes 121 and 122, after the internal electrodes 121 and 122 are cut so as to be exposed to the fifth and sixth surfaces 5 and 6 of the body 110 after lamination, the side margin portions 114 and 115 may also be formed by stacking a single dielectric layer 111 or two or more dielectric layers 111 on both end surfaces of the capacitance formation portion Ac in a third direction.

The first side margin portion 114 and the second side margin portion 115 may not include the internal electrodes 121 and 122, and may include the same material as the dielectric layer 111. That is, the first side margin portion 114 and the second side margin portion 115 may include a ceramic material, for example, a barium titanate ($BaTiO_3$)-based ceramic material.

Meanwhile, a width wm of the first and second side margin portions 114 and 115 is not particularly limited.

However, in order to more easily achieve miniaturization and high capacitance of the multilayer electronic component 100, the width wm of the first and second side margin portions 114 and 115 may be 100 µm or less, preferably 30 µm or less, and more preferably 20 µm or less in an ultra-small product.

Here, the width wm of the side margin portions 114 and 115 may refer to a size of each of the side margin portions 114 and 115 in a third direction. In addition, the width wm of the side margin portions 114 and 115 may refer to an average width wm of the side margin portions 114 and 115, and an average size of the side margin portions 114 and 115 in the third direction.

The average size of the side margin portions 114 and 115 in the third direction may be measured by scanning an image of a cross-section of the body 110 in the first and third directions with a scanning electron microscope (SEM) with a magnification of 10,000. More specifically, it may refer to an average value calculated by measuring a size thereof in the third direction at 10 equally spaced points in the first direction in the scanned image of one side margin portion.

Meanwhile, as a method for simultaneously achieving miniaturization and high capacitance of multilayer electronic components, a method of using a material having a high dielectric constant or reducing a thickness of a dielectric layer or an internal electrode layer may be used. However, when the thickness of the dielectric layer is excessively reduced, problems such as a decrease in dielectric breakdown voltage (BDV) or a decrease in reliability may occur.

Accordingly, by applying a method of thinning an external electrode, a volume of a portion not directly related to the capacitance of the multilayer electronic component can be minimized and an effective volume can be maximized. As a method of thinning the external electrode, there are methods of forming the external electrode with a plating film or applying a thin film deposition method such as sputtering. However, when the external electrode is formed by these methods, there is a concern that delamination between the body and the external electrode may occur due to lack of bonding strength with the ceramic body.

In order to solve this problem, research is being conducted to perform various pretreatments such as forming surface roughness on the body or forming other materials so that bonding between the ceramic body and external electrodes can be facilitated.

Therefore, according to an embodiment of the present disclosure, a lattice-type groove shape having a plurality of grooves arranged in a lattice form may be formed in at least a portion of a surface of the body 110, thereby improving interfacial bonding strength with external electrodes.

In the present disclosure, a surface on which the lattice-type groove shape 141 is formed may be formed on first to sixth surfaces 1, 2, 3, 4, 5, and 6 of a body, when cover portions 112 and 113 are disposed, the surface on which the lattice-type groove shape 141 is formed may be formed in at least a portion of outer surfaces of the cover portions 112 and 113, parallel to the first to sixth surfaces 1, 2, 3, 4, 5, and 6 of the body, and when side margin portions 114 and 115 are disposed, the surface on which the lattice-type groove shape 141 is formed may be formed in at least one of outer surfaces of the side margin portions 114 and 115, parallel to the first to sixth surfaces 1, 2, 3, 4, 5, and 6 of the body.

The lattice-type groove shape 141 may include an outer wall and the groove surrounded by the outer wall, and in this case, the groove may have a shape in which a width thereof decreases in an inward direction of the body 110.

The lattice-type groove shape may include, for example, at least one of a waffle shape, a wave shape, or a dome shape, but is not particularly limited thereto, and may include all shapes in which a three-dimensional repetitive pattern is formed on a surface of the body 110.

The lattice-type groove shape 141 may be formed by irradiating a laser to one surface of the sintered body 110 or at least a portion of outer surfaces of the side margin portions 114 and 115, but is particularly limited thereto, and any method capable of forming a repetitive pattern may be used.

Meanwhile, when a lattice-type groove shape is formed using a laser, a size and depth may be adjusted by adjusting an intensity, a scan speed, and a frequency of the laser, and when a pattern shape having a certain depth and a certain area (or width) is formed, adhesion between the body and the external electrode may be improved. A specific depth and area (or width) of the lattice-type groove shape 141 will be described in more detail below.

In the present disclosure, the lattice-type groove shape 141 may mean one lattice-type groove shape 141, or may mean that a lattice-type groove shape is formed in a certain region with a plurality of grooves. The lattice-type groove shape having a plurality of grooves 141 may not mean that the plurality of grooves are completely the same, but may mean that substantially the same shape is repeatedly formed.

In order to more easily understand the lattice-type groove shape 141, in the present disclosure, a lattice and an inside of the lattice may be described as a two-dimensional plane, but the lattice and the inside of the lattice may be substantially a three-dimensional solid having surface roughness or depth, width, and height.

The groove may have a fine shape in which the width decreases in an inner direction of the body 110, and the fine shape may have various cross-sections such as a rectangle, a semi-circle, a semi-ellipse, and a triangle, but is not particularly limited thereto.

In an embodiment of the present disclosure, when a ten-point average surface roughness of grooves is defined as R2z, R2z≥3 µm may be satisfied.

It is not particularly limited as long as the ten-point average surface roughness value (R2z) inside the lattice can improve the surface bonding strength between the body 110 and the external electrodes 131 and 132, but a preferable upper limit may be 10 μm or less.

The ten-point average surface roughness (Rz) may mean, for example, after extracting only a standard length in a direction of an average line from a roughness curve by measurement, a sum of average values of absolute values measured from the highest peak to the $5^{th}$ peak measured in a direction of vertical magnification and average values of absolute values measured from the lowest peak to the $5^{th}$ peak from the average line of this extracted part. By applying the ten-point average surface roughness, the inside of the grid having different surface roughness can be expressed as a more reliable surface roughness value.

When the ten-point average surface roughness (R2z) of the grooves satisfies 3 μm or more, an interfacial area between the body 110 and the external electrodes 131 and 132 increases, so that the interfacial bonding strength can be further improved.

When the ten-point average surface roughness (R2z) of the groove is less than 3 μm, an interfacial area between the body 110 and the external electrodes 131 and 132 may not be sufficient, and as a result, delamination between the body 110 and the external electrodes 131 and 132 may occur.

In the present disclosure, information related to surface roughness, such as surface roughness, average surface roughness, maximum surface roughness, ten-point average surface roughness, and the like, may be a result of measurement through a surface roughness measuring instrument (Keyence VK-X3000 model), and any measuring instrument capable of measuring surface roughness at a minute depth may be used.

Meanwhile, when a maximum length of the lattice groove shape is defined as L based on the plan view, L≤10 μm may be satisfied.

A lower limit of the maximum length (L) of the lattice-type groove shape is not particularly limited, but may be any value at which the inside of the lattice may have an area, for example, may be 1 μm or more, preferably 3 μm or more, and more preferably 5 μm or more.

When the maximum length of the lattice-type groove is 10 μm or less, a surface area of the body 110 may be increased to improve interfacial bonding strength between the body 110 and the external electrodes 131 and 132.

In this case, when the area of the lattice-type groove shape is defined as "A" based on the plan view, $A \leq 0.5 \times L^2$ may be satisfied.

When the area of the lattice-type groove shape is defined as "A", by satisfying $A \leq 0.5 \times L^2$, the surface area of the body 110 can be increased to improve the interfacial bonding strength between the body 110 and the external electrodes 131 and 132.

In the present disclosure, the maximum length (L) of the lattice-like groove shape may mean a value measured in the following manner, but an embodiment thereof is not limited thereto.

For example, after mounted so that the first surface of the body 110, which is a surface of the body 110 where the lattice-type groove shape is located, is exposed through a scanning electron microscope (SEM) or transmission electron microscope (TEM) with a magnification of 20000, images may be obtained by capturing images at ¼, ⅔, and ¾ points of the body with respect to a third direction. A cross-section of the body, which can be seen in the image taken at the ¼ point of the body in the third direction, may protrude at a certain distance by the lattice-type groove, and the protruding portion in this case may be defined as a floor. When a distance between adjacent floors is measured, which is referred to as 1 point, a value obtained by measuring the distance and averaging the same may be defined as a representative lattice length l1. Representative lattice lengths l2 and l3 measured at points ⅔ and ¾ points of the body in the third direction may be obtained using the same method as the above-described measurement method. In this case, the largest value (Max (l1, l2, l3)) among l1, l2, and l3 may be defined as a maximum length "L" of the lattice-type groove.

The area (A) of the lattice-type groove shape based on the plan view may mean a value obtained by measuring an area inside the lattice-type groove shape based on the images captured by the above-described method.

For example, when measuring an area of a lattice-type groove shape formed on a cross-section of a body that can be seen in an image taken at a ¼ point of the body in the third direction and is called as a 1 point, an area of 10 points may be measured and a value obtained by averaging the area may be defined as a representative lattice area a1. Representative lattice areas a2 and a3 measured at ⅔ and ¾ points of the body in the third direction may be obtained using the same method as the above-described measurement method. In this case, the largest value (Max (a1, a2, a3)) among a1, a2, and a3 may be defined as the area "A" of the lattice-shaped groove.

Although a structure in which the ceramic electronic component 100 has two external electrodes 131 and 132 is described in an embodiment of the present disclosure, the number and shape of the external electrodes 131 and 132 may be changed according to the shape of the internal electrodes 121 and 122 or other purposes.

The external electrodes 131 and 132 may be disposed on the body 110 and connected to the internal electrodes 121 and 122.

More specifically, the external electrodes 131 and 132 may include first and second external electrodes 131 and 132 respectively disposed on the third and fourth surfaces 3 and 4 of the body 110, and respectively connected to the first and second internal electrodes 121 and 122. That is, the first external electrode 131 may be disposed on the third surface 3 of the body and connected to the first internal electrode 121, and the second external electrode 132 may be disposed on the fourth surface 4 of the body and connected to the second internal electrode 122.

The external electrodes 131 and 132 may be formed of any material as long as they have electrical conductivity, such as metal, or the like, and a specific material may be determined in consideration of electrical characteristics, structural stability, and the like, and may further have a multilayer structure.

For example, the external electrodes 131 and 132 may include electrode layers 131a and 132a disposed on the body 110 and plating layers 131b, 132b, 131c, 132c, 131d, and 132d disposed on the electrode layers 131a and 132a.

As a more specific example of the electrode layers 131a and 132a, the electrode layers 131a and 132a may be sintered electrodes formed of conductive metal and glass or resin-based electrodes formed of conductive metal and a resin.

In addition, the electrode layers 131a and 132a may have a form in which a sintered electrode and a resin-based electrode are sequentially formed on the body 110.

In addition, the electrode layers 131a and 132a may be formed by transferring a sheet including a conductive metal onto the body 110 or by transferring a sheet including a conductive metal onto a sintered electrode.

The conductive metal used in the electrode layers 131a and 132a is not particularly limited as long as it is a material that can be electrically connected to the internal electrodes 121 and 122 to form capacitance, and include for example, at least one selected from a group consisting of nickel (Ni), copper (Cu), palladium (Pd), silver (Ag), gold (Au), platinum (Pt), tin (Sn), tungsten (W), titanium (Ti) and alloys thereof.

In addition, the electrode layers 131a and 132a may be electrode layers 131a and 132a formed by a thin film deposition method such as sputtering or a plating method.

An average thickness of the electrode layers 131a and 132a formed by a sputtering method, or the like may be 1 µm or less, preferably, a lower limit thereof may be 0.1 µm or more, and more preferably, a lower limit thereof may be 0.3 µm or more.

When the electrode layers 131a and 132a are formed by a thin film deposition method, or the like, the electrode layers 131a and 132a having a uniform and thin film thickness may be formed. Accordingly, miniaturization and high capacitance of the multilayer electronic component 100 can be simultaneously achieved.

An average thickness of the electrode layers 131a and 132a may be measured, for example, in the following manner, but is not particularly limited thereto.

Based on a cross-section of the multilayer electronic component 100 in the first and second directions, it may be obtained by measuring a size of electrode layers 131a and 132a formed in a central portion thereof in a first direction in a second direction and a size of the electrode layers 131a and 132a at a point spaced apart from the central portion, in the first direction in a second direction at regular intervals, for example, by 3 µm and then averaging the same. As the number of measured values of the sizes of the electrode layers 131a and 132a in the second direction measured at regular intervals increases, the average thickness of the electrode layers 131a and 132 can be more generalized.

The plating layers 131b, 132b, 131c, 132c, 131d, and 132d may serve to improve mounting characteristics.

The type of the plating layers 131b, 132b, 131c, 132c, 131d, and 132d is not particularly limited, and may be a single layer plating layer including at least one of copper (Cu), nickel (Ni), tin (Sn), or alloys thereof, or may be formed of a plurality of layers.

For more specific examples of the plating layers 131b, 132b, 131c, 132c, 131d, and 132d, the plating layers 131b and 132b may be Ni plating layers or Sn plating layers, and may have a form in which copper (Cu) plating layer 131b and 132b, nickel (Ni) plating layers 131c and 132c, tin (Sn) plating layers 131d and 132d are sequentially disposed on the electrode layers 131a and 132a.

The lattice-type groove shape according to the present disclosure may be located in at least a portion of the surface of the body 110 in contact with the external electrodes 131 and 132.

In other words, it may mean that it is located in at least a portion of a surface of the body 110, an interface with which the body 110 and the external electrodes 131 and 132 are in contact.

As described above, when the electrode layers 131a and 132a are formed by a sputtering method, or the like, glass frit or the like may not be added. Accordingly, delamination may occur between the body and the electrode layer due to lack of bonding force with the ceramic body, and by forming the lattice-type groove shape of the present disclosure on a surface of the body, a surface area between the body and the electrode layer may be increased, thereby improving interfacial bonding strength between the body and the electrode layer.

More specifically, when the first external electrode 131 is disposed on the third surface 3, a portion of the first surface 1, and a portion of the second surface 2 of the body, the lattice-type groove shape 141 may also be located on the third surface 3, the portion of the first surface 1, and the portion of the second surface 2 of the body. When the second external electrode 132 is disposed on the fourth surface 4, a portion of the first surface 1, and a portion of the second surface 2 of the body, the lattice-type groove shape 141 may also be located on the fourth surface 4, the portion of the first surface 1, and the portion of the second surface 2 of the body.

In this case, an area in which the lattice-type groove shapes are formed may be 10% or more compared to that of a surface of the body 110 in contact with the external electrodes 131 and 132.

More specifically, when the first external electrode 131 is disposed on the third surface 3 and a portion of the first surface 1 and a portion of the second surface 2 of the body, the lattice-type groove shape 141 may also be located on the third surface 3 and a portion of the first surface 1 and a portion of the second surface 2 of the body.

Here, a contact area between the first external electrode 131 and the body 110 is defined as S, and area in which the body 110 and the first external electrode 131 are in contact is defined as TA, TA/S≥10% may be satisfied. The description of the first external electrode 131 can be equally applied to the description of the second external electrode 132.

The area of the lattice-type groove shape 141 compared to the surface of the body 110 in contact with the external electrodes 131 and 132 may satisfy 10% or more, thereby improving interfacial bonding strength between the body 110 and the external electrodes 131 and 132 and delamination or lifting may be prevented from occurring.

In addition, the lattice-type groove shape 141 may also be located on the surface of the body 110 on which the external electrodes 131 and 132 are not disposed, and thereby, when mounted on a substrate, bonding strength by solder or the like, to the surface of the body 110 on which the external electrode is not disposed may be improved.

Meanwhile, the lattice-type groove shape 141 may be located on the third and fourth surfaces 3 and 4 of the body, but the internal electrodes 121 and 122 may be located on the third and fourth surfaces 3 and 4 of the body, but a lattice-type groove shape may not be located in a region in contact with the third and fourth surfaces 3 and 4 of the body and exposed externally.

This may be a result of etching only the dielectric layer 111 without etching a metal of an internal electrode in a region of a specific wavelength band when the lattice-type groove shape is formed using a laser.

However, it is not particularly limited thereto, and the lattice-type groove shape 141 may be formed in the internal electrodes 121 and 122 by adjusting an intensity, frequency of the laser, and the like, thereby contributing to increasing the interfacial bonding strength.

When the side margin portions 114 and 115 are disposed on the fifth and sixth surfaces 5 and 6 of the body, and the external electrodes 131 and 132 are disposed on the side margin portions 114 and 115, a lattice-type groove shape 141 may be disposed on at least a portion of outer surfaces of the side margin portions 114 and 115.

For example, when the first side margin portion 114 is disposed on the fifth surface 5 of the body, a lattice-type groove shape may be disposed in a region where the external electrode is disposed, among outer side surfaces of the first side margin portion 114, parallel to the fifth surface 5 of the body. In addition, when both end-surfaces of the first side margin part 114 in the second direction are on the same plane as the third and fourth surfaces 3 and 4 of the body, a lattice-type groove shape may be disposed in at least a portion of end-surfaces of the first side margin portion 114 in the second direction. The description of the first side margin portion 114 can be equally applied to the second side margin portion 115.

In other words, since the lattice-type groove shape 141 is located in the region in contact with the external electrodes 131 and 132, delamination or lifting of the external electrodes 131 and 132 can be suppressed, and miniaturization and high capacitance of the multilayer electronic component can be achieved, and reliability can be excellent.

A size of the multilayer electronic component 100 is not particularly limited.

However, to achieve both miniaturization and high capacitance, since the number of stacked layers should be increased by thinning dielectric layers and internal electrodes, an effect of improving reliability may become more remarkable in the multilayer electronic component 300 having a size of 1005 (length×width, 1.0 mm×0.5 mm) or less.

Although the embodiments of the present disclosure have been described in detail above, the present invention is not limited by the above-described embodiments and the accompanying drawings, and is intended to be limited by the appended claims. Therefore, various forms of substitution, modification and change will be possible by those skilled in the art within the scope of the technical spirit of the present disclosure described in the claims, and this also falls within the scope of the present disclosure.

Hereinafter, the present disclosure will be described in more detail through examples, but this is to help a detailed understanding of the disclosure, and the scope of the present disclosure is not limited by the examples.

EXAMPLE

Hereinafter, results of evaluating an interfacial bonding strength of Test Example 1 in which a lattice-type groove shape was formed on a surface of a body and of Test Example 2 in which a lattice-type groove shape was not formed thereon will be described.

In Test Example 1, a lattice-type groove shape was formed in a ceramic region of a third surface of a chip using a 1.5 watt (W) intensity of laser, and then a copper (Cu) electrode layer was formed to a thickness of 0.5 μm using a sputtering method. Thereafter, a copper (Cu) electroplating layer was plated on the copper (Cu) electrode layer to a thickness of 3 μm to conduct a tape test, which is a kind of adhesion evaluation. After the tape test described later, a maximum length (L) measured from an image taken of a lattice-type groove shape through a scanning electron microscope (SEM) was 10 μm, and an area (A) thereof was 48 μm².

Test Example 2 was manufactured in the same manner as Test Example 1 except that the lattice-type groove shape was not formed on the surface of the body.

The tape test is a test to evaluate whether or not a copper (Cu) electrode layer of an external electrode is peeled off by repeatedly attaching and detaching a tape material having adhesive strength to an external electrode including a copper (Cu) electrode layer.

After manufacturing 25 sample chips for each of Test Example 1 and Test Example 2, as a result of the tape test in which attachment and detachment were performed 10 times, delamination of the copper (Cu) electrode layer did not occur, while in Test Example 2, delamination of the copper (Cu) electrode layer occurred in 5 sample chips out of 25 sample chips.

From this, it can be seen that delamination between the body and the external electrode may be suppressed by increasing a surface area of the body by forming a lattice-type groove shape.

Next, data measured for an optimal maximum length (L), area (A), average surface roughness (Ra), ten-point average surface roughness (Rz), and surface area of the lattice-type groove shape will be described.

The maximum length (L) of the lattice-type groove shape refers to a maximum length that may be measured in the lattice-type groove shape in an image taken through a scanning electron microscope (SEM), and the area (A) refers to an inner area of one lattice-type groove shape in an image taken through a scanning electron microscope (SEM). The average surface roughness (Ra) and ten-point average surface roughness (Rz) were measured using a surface roughness meter, and a surface area growth rate (Sdr) refers to a growth rate of an actual three-dimensional area of one lattice-type groove shape, which means that the larger the surface area, the higher a level of fineness.

Test Example 3 is a sample chip in which a lattice-type groove shape is not formed on a surface of the body of the sample chip, and a manufacturing method is the same as Test Example 2 described above.

Figure 11A:
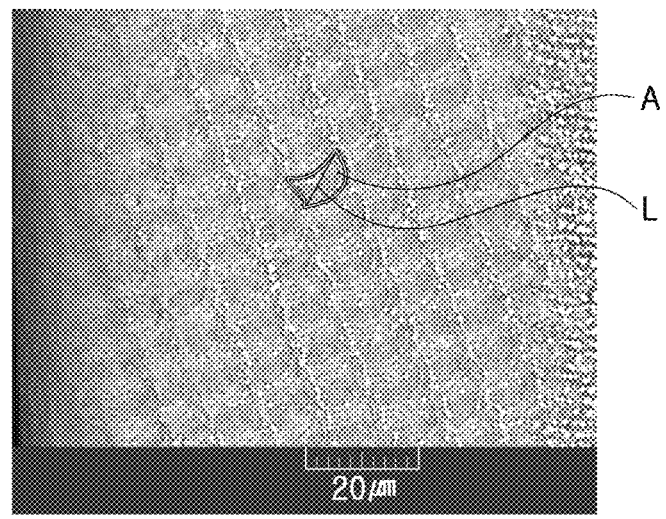
FIG. 11A is an image taken through a scanning electron microscope (SEM) of a surface of a body of an embodiment.

In Test Example 4, after completing the surface roughness measurement of Test Example 3, a 1.5 Watt (W) intensity of laser was irradiated to a surface of the body of the sample chip to form a lattice-type groove shape, and then the surface roughness was measured again. The manufacturing method is the same as in Test Example 1 described above. FIG. 11A is an image taken through a scanning electron microscope (SEM) to measure a maximum length (L) and an area (A) of the lattice-type groove shape formed on a surface of the body of Test Example 4.

Figure 11B:
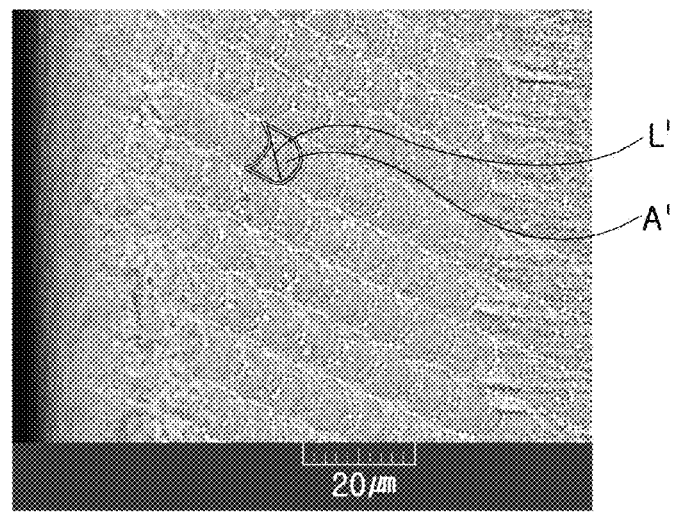
FIG. 11B is an image taken through a scanning electron microscope (SEM) of a surface of a body of Comparative example.

In Test Example 5, a 1.0 watt (W) intensity of laser was irradiated to the surface of the body of a new sample chip to form a lattice-type groove shape, and surface roughness was measured. Except for the intensity of the laser, a manufacturing method is the same as in Test Example 1 described above. FIG. 11B is an image taken through a scanning electron microscope (SEM) to measure a maximum length (L') and an area (A') of the lattice-type groove shape formed on a surface of the body of Test Example 5.

TABLE 1

| | Surface roughness measuring instrument | | | Scanning electron microscope | |
| --- | --- | --- | --- | --- | --- |
| | Average surface roughness(Ra) (μm) | Ten-point surface roughness (Rz) (μm) | Surface area growth rate (Sdr) | Maximum length(L) (μm) | Area(A) (μm²) |
| Test example 3 | 0.181 | 1.750 | 0.03753 | — | — |
| Test example 4 | 0.655 | 4.070 | 0.08183 | 10 | 48 |
| Test example 5 | 0.201 | 1.390 | 0.06056 | 12 | 66.5 |

In the case of Test Example 3 in which a lattice-type groove shape was not formed, which may be evaluated as representing surface roughness of a general body, and an average surface roughness (Ra) was measured to be 0.181 µm, a ten-point average surface roughness (Rz) was measured to be 1.750 µm, and a surface area growth rate (Sdr) was measured to be 0.03753.

In the case of Test Example 4 in which a lattice-type groove shape was formed, and average surface roughness (Ra) was measured to be 0.655 µm, a ten-point average surface roughness (Rz) was measured to be 4.070 µm, a surface area growth rate (Sdr) was measured to be 0.08183, and a maximum length (L) was measured to be 10 µm, and an area (A) measured to be 48 µm².

In the case of Test Example 5 in which a lattice-type groove shape was formed, different from Test Example 4, an average surface roughness (Ra) was measured to be 0.201 µm, a ten-point average surface roughness (Rz) was measured to be 1.390 µm, a surface area growth rate (Sdr) was measured to be 0.06056, and a maximum length (L) 12 µm, and an area (A) was measured to be 66.5 µm².

The surface area growth rate (Sdr) of Test Example 4 was 0.08183, which is 2.18 times higher than the surface area growth rate (Sdr) of Test Example 3, 0.03753, in which no lattice-type grooves were formed. When the surface area growth rate increases by more than two times, it can be predicted that an interfacial bonding force between the body and the external electrode can increase, and to this end, it can be seen that the lattice-type groove shape of Test Example 4 is an optimal condition.

The surface area growth rate (Sdr) of Test Example 5 is 0.06056, which is 1.61 times higher than the surface area growth rate (Sdr) of Test Example 3, 0.03753, in which no lattice-type grooves are formed. It is the same that the surface area growth rate increases, but it can be seen that it has slightly inferior characteristics than Test Example 4.

As set forth above, according to one of the various effects of the present disclosure, miniaturization and high capacitance of multilayer electronic components may be achieved.

One of the various effects of the present disclosure is to improve the reliability of multilayer electronic components.

One of the various effects of the present disclosure is to improve an interfacial bonding strength between the body and the external electrode.

In the present specification, the expression 'an embodiment' used in the present disclosure does not mean the same embodiment, and is provided to emphasize and describe different unique characteristics. However, an embodiment presented above is not excluded from being implemented in combination with features of another embodiment. For example, even if a matter described in one specific embodiment is not described in another embodiment, it can be understood as a description related to another embodiment, unless there is a description contradicting or contradicting the matter in the other embodiment.

Terms used in this disclosure are only used to describe one embodiment, and are not intended to limit the disclosure. In this case, singular expressions include plural expressions unless the context clearly indicates otherwise.

While example embodiments have been shown and described above, it will be apparent to those skilled in the art that modifications and variations could be made without departing from the scope of the present invention as defined by the appended claims.

What is claimed is:

1. A multilayer electronic component, comprising:
    a body including a dielectric layer and internal electrodes; and
    an external electrode disposed on the body,
    wherein a lattice-type groove shape having a plurality of grooves arranged in a lattice form is formed in at least a portion of a surface of the body, and
    when a maximum length of the lattice-type groove shape is defined as L based on a plan view, L≤10 µm is satisfied.

2. The multilayer electronic component of claim 1, wherein the lattice-type groove shape comprises an outer wall and the groove surrounded by the outer wall, and
    the groove has a shape in which a width thereof decreases in an inner direction of the body.

3. The multilayer electronic component of claim 1, wherein the lattice-type groove shape comprises at least one of a waffle shape, a wave shape, or a dome shape.

4. The multilayer electronic component of claim 1, wherein when a ten-point average surface roughness of the groove is defined as R2z, R2z≥3 µm is satisfied.

5. The multilayer electronic component of claim 1, wherein when an area of the lattice-type groove shape is defined as A based on a plan view, A≤0.5×L² is satisfied.

6. The multilayer electronic component of claim 1, wherein the lattice-type groove shape is formed in at least a portion of the surface of the body in contact with the external electrode.

7. The multilayer electronic component of claim 6, wherein an area in which the lattice-type groove shape is formed is 10% or more compared to an area of the surface of the body in contact with the external electrode.

8. The multilayer electronic component of claim 6, wherein the lattice-type groove shape is further formed on the surface of the body in which the external electrode is not disposed.

9. The multilayer electronic component of claim 1, wherein the body comprises a capacitance formation portion including the dielectric layer and the internal electrodes alternately disposed in a first direction with the dielectric layer interposed therebetween, and a cover portion respectively disposed on both end surfaces of the capacitance formation portion in the first direction, the body including first and second surfaces facing each other in the first direction, third and fourth surfaces connected to the first and second surfaces and facing each other in a second direction, and fifth and sixth surfaces connected to the first to fourth surfaces and facing each other in a third direction, and
    a side margin portion respectively disposed on the fifth and sixth surfaces of the body.

10. The multilayer electronic component of claim 9, wherein the internal electrode comprises a first internal electrode in contact with the third surface of the body and a second internal electrode in contact with the fourth surface of the body, and
    the lattice-type groove shape is not formed on one side surface of the first internal electrode in contact with the third surface of the body and one side surface of the second internal electrode in contact with the fourth surface of the body.

11. The multilayer electronic component of claim 9, wherein the lattice-type groove shape is further formed in at least a portion of an external surface of the side margin portion.

12. The multilayer electronic component of claim 1, wherein the external electrode comprises an electrode layer disposed on the body and connected to the internal electrode, and an average thickness of the electrode layer is 1 μm or less.

13. The multilayer electronic component of claim 12, wherein the electrode layer comprises copper (Cu).

14. The multilayer electronic component of claim 12, wherein the external electrode further comprises a plating layer disposed on the electrode layer, and the plating layer comprises at least one of a copper (Cu) plating layer, a nickel (Ni) plating layer, or a tin (Sn) plating layer.

15. The multilayer electronic component of claim 14, wherein the plating layer is disposed in an order of the copper (Cu) plating layer, the nickel (Ni) plating layer, and the tin (Sn) plating layer.

16. A multilayer electronic component, comprising:
a body including a dielectric layer and internal electrodes; and
an external electrode disposed on the body,
wherein at least a portion of a surface of the body that is covered by the external electrode has a repetitive pattern shaped by a plurality of grooves forming a plurality of areas, each area being surrounded by the grooves, and
when a maximum length of repetitive pattern is defined as L based on a plan view, L≤10 μm is satisfied.

17. The multilayer electronic component of claim 16, wherein an area in which the repetitive pattern is formed is 10% or more compared to an area of the surface of the body in contact with the external electrode.

18. The multilayer electronic component of claim 16, wherein when a ten-point average surface roughness of the repetitive pattern is defined as R2z, R2z≥3 μm is satisfied.

19. A multilayer electronic component, comprising:
a body including a dielectric layer and internal electrodes; and
an external electrode disposed on the body, wherein a lattice-type groove shape having a plurality of grooves arranged in a lattice form is formed in at least a portion of a surface of the body, and
when a maximum length of the lattice-type groove shape is defined as L, an area of the lattice-type groove shape is defined as A based on a plan view, A≤0.5×L² is satisfied.

20. The multilayer electronic component of claim 19, wherein the lattice-type groove shape comprises an outer wall and the groove surrounded by the outer wall, and
the groove has a shape in which a width thereof decreases in an inner direction of the body.

21. The multilayer electronic component of claim 19, wherein the lattice-type groove shape comprises at least one of a waffle shape, a wave shape, or a dome shape.

22. The multilayer electronic component of claim 19, wherein when a ten-point average surface roughness of the groove is defined as R2z, R2z≥3 μm is satisfied.

* * * * *